United States Patent [19]

Ishioka et al.

[11] Patent Number: 4,895,002
[45] Date of Patent: Jan. 23, 1990

[54] AIR CONDITIONING DEVICE

[75] Inventors: Hidenori Ishioka; Hiroyuki Umemura; Kenji Matsuda; Tetsuji Okada; Katsuyuki Aoki; Seiji Kubo, all of Shizuoka, Japan

[73] Assignee: Mitsubishi Denki Kabushiki Kaisha, Tokyo, Japan

[21] Appl. No.: 295,530

[22] Filed: Jan. 11, 1989

[30] Foreign Application Priority Data

Jan. 11, 1988 [JP] Japan .................................... 62-3384
Jan. 14, 1988 [JP] Japan .............................. 62-3318[U]
Mar. 18, 1988 [JP] Japan .................................... 62-65182

[51] Int. Cl.$^4$ ........................ F24B 1/06; F25D 17/00
[52] U.S. Cl. ........................................ 62/408; 62/180; 98/31.6; 165/127
[58] Field of Search ................. 165/122, 127; 98/31.6, 98/34.6, 39.1, 40.01, 40.2; 62/180, 186, 408

[56] References Cited

U.S. PATENT DOCUMENTS 4,729,293 3/1988 Tsunoda et al. .................... 98/40.24

FOREIGN PATENT DOCUMENTS 55-105140 8/1980 Japan .
0131640 10/1980 Japan ..................................... 62/186
0059145 3/1986 Japan ..................................... 62/180
61-38383 8/1986 Japan .
0033246 2/1987 Japan ..................................... 62/180

Primary Examiner—William E. Wayner
Attorney, Agent, or Firm—Oblon, Spivak, McClelland, Maier & Neustadt

[57] ABSTRACT

An air conditioning device comprises a refrigerant compression cycle having an electrically driven compressor, an electric motor for driving the compressor, frequency changing means for changing the frequency of a.c. power to be applied to the motor, an outlet port for blowing off conditioned air, flowing direction changing means for changing the flowing direction of the conditioned air from the outlet port, a switch which is actuated by a user when he desires to allow the conditioned air to hit himself directly, and control means for controlling the frequency changing means and the flowing direction changing means, wherein when the switch is actuated during room cooling operation, the control means outputs to the flowing direction changing means a signal for directing the conditioned air from the outlet port in a downward flowing direction.

3 Claims, 10 Drawing Sheets

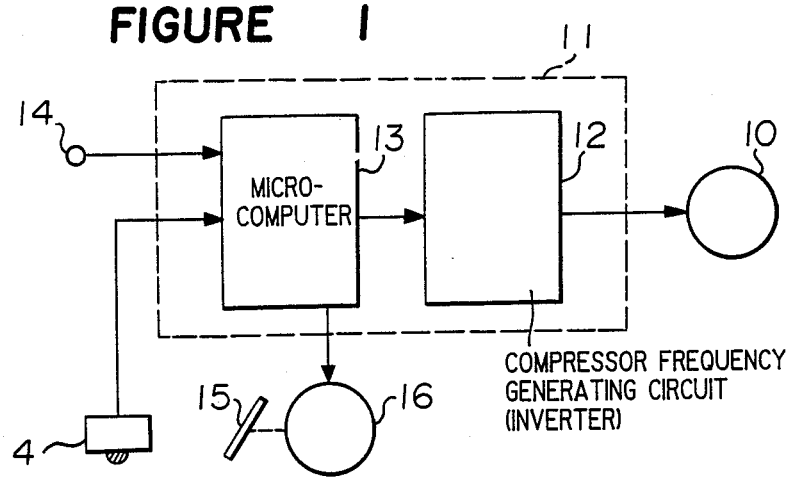
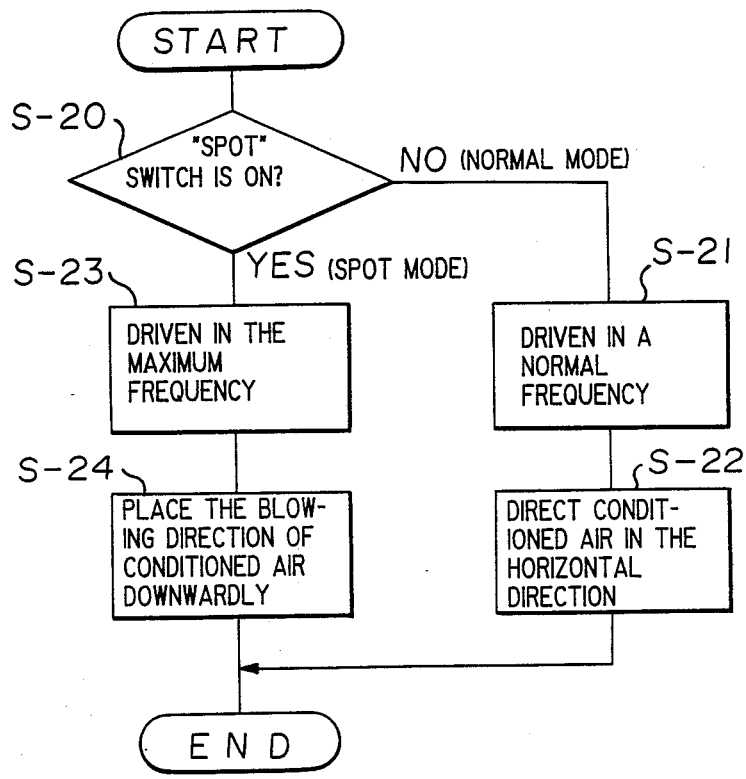

AIR CONDITIONING DEVICE

The present invention relates to air blow control in an air conditioning device.

FIGS. 11 and 12 shows the essential parts of a conventional inverter drive type of air conditioning device. FIG. 11 is a block diagram showing the control unit of the conventional air conditioning device. FIG. 12 is a cross sectional view showing the outlet port of a ceiling mounted or wall mounted type of air conditioning device as for example disclosed in Japanese Examined Patent Publication No. 3349/1982. In FIGS. 11 and 12, reference numeral 10 designates an electric motor (compressor motor) which is an element constituting an electrically driven compressor. The compressor, an indoor heat exchanger, a decompression device and an outdoor heat exchanger are connected in series to form a refrigerant compression cycle. Reference numeral 11 designates a control unit which is constituted by compressor frequency generating circuit (inverter) 12 as frequency changing means for the motor 10 and a microcomputer 13 as control means. The control unit controls the frequency of three phase a.c. power applied to the motor 10, based on a room temperature detected by a temperature sensor 14. Reference numeral 15 designates a blade which is used for changing the flowing direction of air (conditioned air) blown off from an outlet port 17 into the room, and which is arranged in a supply port 18 at a position in the vicinity of its central portion so as to be rotatable about a shaft 19. Reference numeral 16 designates a blade driving electric motor as flowing direction changing means, which is used to rotate the blade 15. Reference numeral 20 designates the upper end of the outlet port. Reference numeral 21 designates a lower guide wall in a curved form, which has the front surface formed with a guiding surface made of heat insulating material 22 having a predetermined thickness.

In the conventional inverter drive type of air conditioning device, the blade 15 is arranged in the supply port 18 in the vicinity of its central portion so as to be rotatable about the shaft 19. As a result, the conditioned air which flows from the supply port 18 into the outlet port 17 flows along the blade 15, and is blown off from the outlet port 17 in either an upward direction, a lower direction or the horizontal direction depending on the incline of the blade 15.

The blowing direction of the conditioned air is usually determined taking the temperature distribution in the room and the sense of a user in the room into account.

Specifically, if cool air which is blown off on room cooling operation is blown off downwardly, it will little spread in the room and hit the user directly, coupled with its tendency to head downwardly due to its heaviness. A user who is in a normal condition, not in an abnormal condition, generally feels that the cool air hit himself directly is uncomfortable.

For the reasons, the cool air is usually blown off upward in the room, i.e. it is blown off in the horizontal direction in the wall mounted or ceiling mounted type of air conditioning device because such device is mounted at an upper portion in the room, and it is blown off upwardly in an air conditioning device which is put on the floor or mounted on the wall at a lower portion. This allows cool air blown off upwardly in the room to cool the space around a user at a lower portion in the room while it is spreading throughout the inside of the room.

Any type of air conditioning devices have been prevented from blowing off cooled air downwardly with intension. Conversely, if warm air is blown off upwardly in the room, the warm air which has risen once does not come down, thereby preventing the space around a user at a lower portion in the room from becoming warm. For the reason, any type of air conditioning devices have blown off the warm air downwardly in the room so that the warm air blown off downwardly is spreading and rising in the room to warm the entire inside of the room.

The conventional air conditioning devices have been gradually decreasing the frequency of a.c. power applied to the compressor motor 10 as the actual temperature approaches to a set temperature or when the actual temperature has reached a set temperature once, in both room cooling and room heating operation.

Now, another conventional air conditioning device having an upper outlet port and a lower outlet port as described in Japanese Unexamined Patent Publication No. 05140/1980 will be explained in reference to FIGS. 13 to 15.

In FIG. 14, reference numeral 21 designates an indoor unit housing of the air conditioning device which can carry out room cooling and room heating operation. The housing is provided with a upper outlet port 22 and a lower outlet port 23 in the upper and lower portions, and with an intake port 24 in the central portion of the front end. Reference numerals 25 and 26 designate cross flow fans which are arranged in the housing so as to correspond to the upper and lower outlet ports 22 and 23. Reference numeral 27 designates an indoor heat exchanger which is arranged in the housing so as to correspond to the intake port 24, and which functions as an evaporator on room cooling operation and as a condenser on room heating operation. Reference numeral 28 designates an air filter which is provided in the intake port 24. Reference numerals 29 and 30 designate fan casings which are placed around the cross for fans 25 and 26.

The refrigerant circuit of this air conditioning device is constituted by a compressor 31, a four port valve 32, an outdoor heat exchanger 33, a capillary tube 34 for room heating operation, a capillary tube 35 for room cooling operation, two check valves 36 and 37, the indoor heat exchanger 27 and a receiver 38, as shown in FIG. 15.

The electric circuit of this air conditioning device will be explained in reference to FIG. 13. An electric motor 39 for the compressor 31 is connected to power through a main switch 40, a switch 41 having a "cooling" contact and a "heating" contact for selecting either room cooling operation or room heating operation, and a thermostat 42 which is actuated depending on the detection of a room temperature. A relay coil 43 for the four port valve 32 has one end connected to a "heating" contact of the switch 41, and the other end connected to power. Reference numeral 44 designates a switch (hereinbelow, referred to as a sleep switch) which is actuated when a user goes to bed, and which comprises a pair of two switches, the respective switches having one end connected to the "cooling" contact and the "heating" contact of the switch 41 and the other end connected to power through the relay coils 45 and 46, respectively. A fan motor 47 for the upper cross flow fan 25 connected to the main switch 40 through a normally closed relay contact 48 actuated by the relay coil 46, and through a switch 49. A lower fan motor 50 for the lower cross flow fan 26 is connected to the main switch 40 through a normally closed relay contacts 51 actuated by the relay coil 45 and through a switch 52.

In the air conditioning device having such structure, when a normal room cooling or room heating operation is carried out, the main switch 40 is closed, the switch 41 is placed in the position of either the "cooling" contact connection or the "heating" contact connection, and both switches 49 and 52 or either one is closed so as to actuate the compressor 39 and the fan motors 47 and 50, thereby carrying out room cooling or room heating operations.

If the user desires to obtain room cooling or room heating operations when sleeping, he can close the "sleep" switch 44 with the main switch 40 and the switches 49 and 52 closed, thereby obtaining his desired operation. On room cooling operation, the relay coil 45 is energized to open the relay contact 51, thereby stopping the operation of the lower fan motor 50 while continuously driving the upper fan motor 47. As a result, cool air is blown off only from the upper outlet port 22 of the housing 21 which is mounted on an upper portion of the wall of the room. Thus, this system can carry out room cooling operation appropriate to the time when the user sleeps in bed. On the other hand, on room heating operation, the relay coil 46 is energized to open the relay contact 48, thereby stopping the operation of the upper fan motor 47 while continuously driving the lower fan motor 50. As a result, warm air is blown off from the lower outlet port of the housing 21 which is amounted at an upper portion of the wall of the room. Thus, the system can carry out room heating operation appropriate to the time when the user sleeps in bed.

Another conventional air conditioning device having an upper outlet port and a lower outlet port as described in Japanese Examined Patent Publication No. 38383/1986 will be explained in reference to FIG. 16 which is a schematic vertical cross sectional view of the device.

In FIG. 16, reference numeral 61 designates an indoor unit housing. Reference numeral 62 designates an upper cross flow fan which is arranged at an upper portion in the housing 61. Reference numeral 63 designates a lower cross flow fan which is arranged at a lower portion in the housing 61. Reference numeral 64 designates an indoor heat exchanger which is arranged near to the front end of the housing 61 and between the upper cross flow fan 62 and the lower cross for fan 63. Reference numeral 65 designates an upper outlet port which is formed in an upper front end of the housing 61. Reference numeral 66 designate a lower outlet port which is formed in a lower front end of the housing 61.

When the upper and lower cross flow fans 62 and 63 are driven, air which has been inspired from the front end of the housing 61 through the indoor heat exchanger is blown off from the upper outlet port 65 and the lower outlet port 66 into the room in the routes as indicated by arrows 67.

In addition, speed changing means can drive both upper and lower fans 62 and 63 alternately in a higher speed and in a lower speed to make conditioned air blown off from both outlet ports 65 and 66 flow alternately in the routes indicated by arrows A and C and in the routes indicated by arrows B and D in FIG. 17, thereby uniforming air flow distribution in the room to be air conditioned. Time signal producing means can control the times of the higher speed and the lower speed of both fans 62 and 64.

In the conventional air conditioning devices, when the room temperature has reached a set temperature once on room cooling operation, the frequency of a.c. power applied to the compressor motor 10 is decreased. In addition, the frequency is being gradually decreased as the room temperature approaches to a set temperature. As a result, the temperature of the conditioned air on room cooling operation is not so low, and the conditioned air is blown off in the horizontal direction or an upward direction so that the conditioned air is prevented from hitting a user directly. This creates a problem wherein it is difficult to give enough cooling air comfort to the user when since he is hot as he feels after, for example, having bath, he desires to allow cool air hit himself directly.

In addition, since the conventional air conditioning devices are constructed as above, warm air is blown off from both upper and lower outlet ports on normal room heating operation. As a result, the temperature of the warm air blown is low. This creates a problem wherein it is difficult for the user to hit the warm air to himself to warm the body, and the lowness in the temperature of the warm air could give even cool air feeling to the user.

Further, in the conventional air flow control device for air conditioning device as explained above, the upper and lower fans 2 and 3 are driven alternately in the higher speed and in the lower speed in a predetermined pattern by the speed changing means, and the times of the higher speed operation and the lower speed operation are controlled in a predetermined pattern by the time signal generating means. This allows the upper air flow and the lower air flow to get in interference with each other and be agitated, thereby obtaining good temperature distribution in the entire inside of the room. However, the air volume control by such system creates the following problem because this system is directed to air condition a single room. Specifically, even if the user desires to air condition simultaneously a room with the indoor unit installed and a room which adjoins the room with the unit through an openable or detachable partition, he can not obtain satisfactory air conditioning in the adjoining room by a single air conditioning device. This is because the presence of a upper part of the partition which remains in an upper portion between the room with the unit and the adjoining room after having opened or detached a lower part of the partition prevents conditioned air from flowing in the adjoining room even if the air volume blown off from the air conditioning device is increased, though good air conditioning can be obtained in the room with the indoor unit.

It is an object of the present invention to solve those problems and to provide an air conditioning device capable of giving sufficient cool air feeling to a user on room cooling operation and of increasing the temperature of warm air blown off from the device on room heating operation as he desires.

It is another object of the present invention to provide an air flow control device in an air conditioning device wherein a single air conditioning device can realize comfortable air conditioning desired by a user in a room with the indoor unit and in its adjoining room which has a partition between the two rooms opened.

The present invention provides an air conditioning device wherein control means outputs to flowing direction changing means a signal indicative of the air flow blown off from an outlet port in a downward direction, or when a user actuates a switch is actuated when he desires to allow cool air hit himself directly on room cooling operation, or wherein turning on and off upper fan motor is enabled. As a result, even if the entire inside of the room does not become cool, he can surely feel the cool air because the blowing direction of the cool air can be directed to him when he desires to allow the cool air hit himself directly. In addition, on room heating operation, the upper fan motor can be turned off under the user's optional operation, thereby allowing the temperature of warm air from a lower outlet port to be rised.

The present invention also provides an air conditioning device wherein conditioned air is blown off from an upper outlet port and a lower outlet port, comprising operation mode selecting means for selecting either a normal mode or a two room air conditioning mode, the normal mode being for air conditioning a room with the indoor unit installed, and the two room air conditioning mode being for air conditioning the room with the indoor unit and its adjoining room; motor speed determining means for determining the revolutions of an upper and lower fans so as to obtain the conditioned air in the amount of volumes suitable to air condition only the room with the indoor unit and to air condition its adjoining room as well, based on mode command signals from the operation mode selecting means.

As a result, when the operation mode selecting means selects the normal mode, the motor speed determining means sets the motor speeds of the upper and lower fans in values optimum to air condition the room with the indoor unit, based on the normal mode command. When the operation mode selecting means selects the two room air conditioning mode, the motor speed determining means sets the revolution of the upper fan motor in such blowing air volume that the conditioned air from the upper outlet port air conditions mainly the room with the indoor unit, and increases the revolution of the lower fan motor in comparison with that of the upper fan motor to obtain such blowing air volume that the conditioned air from the lower outlet port comes into the adjoining room to air condition mainly the adjoining room. This is carried out based on the two room air conditioning mode command. As a result, the room with the indoor unit and the adjoining room can receive such air flow control by a single air conditioning device. This system can realize comfortable atmosphere desired by user in the two rooms.

In drawings:

FIG. 1 is a block diagram showing a first embodiment of the present invention;

FIGS. 2 through 4 are operation flow charts of the first embodiment;

FIG. 12 is a vertical cross sectional view of the outlet port;

Figure 3:
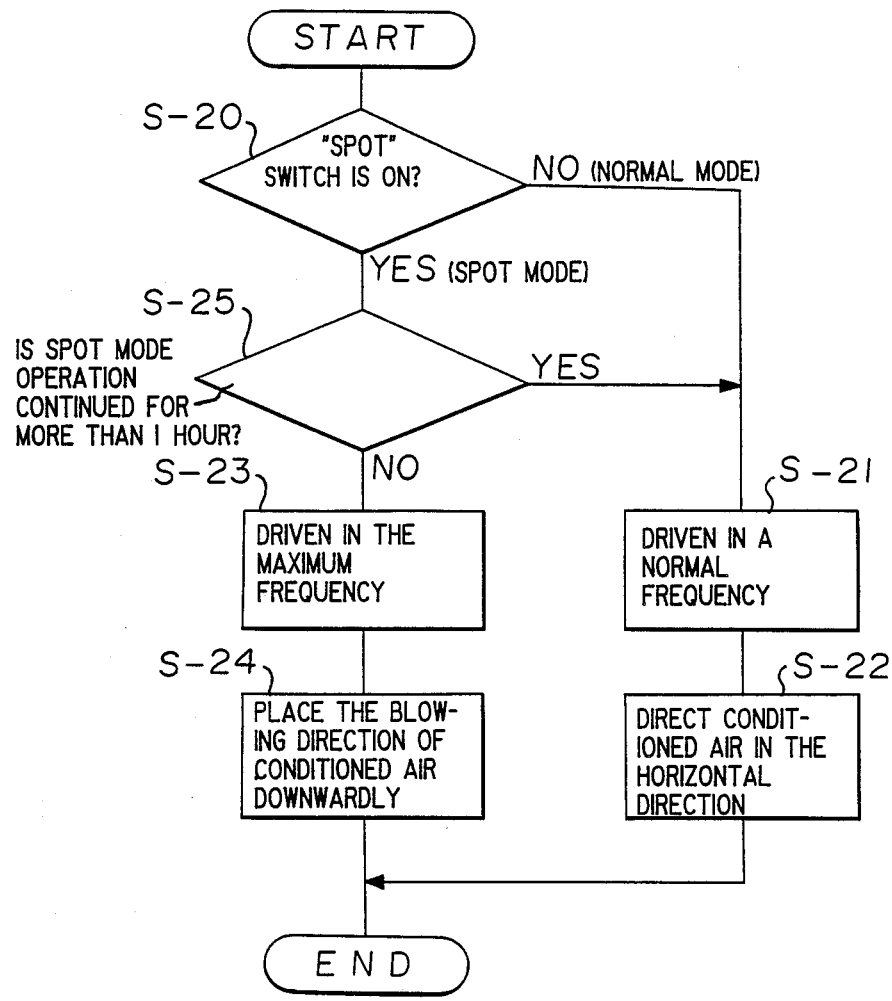

Now, the present invention will be described in detail with reference to preferred embodiments illustrated in the accompanying drawings. Firstly, a first embodiment of the present invention as shown in FIG. 1 will be explained. A control unit 11 is constituted by a compressor frequency generating circuit (inverter) 12 as frequency changing means for an electric motor 10 for a compressor, and a microcomputer 13 as control means. The microcomputer 13 controls three phase a.c. power to be applied to the motor 10 based on a room temperature detected by a temperature sensor 14. The microcomputer 13 also controls an electric motor 16 for driving a blade 15 which is arranged in a supply port. The control unit of the first embodiment is provided with a "spot" switch 4 which is depressed when a user desires to allow cool air hit himself directly. The "spot" switch 4 is connected to the microcomputer 13 as one of inputs. When the "spot" switch is on, the microcomputer 13 controls the inverter 12 to change the frequency of a.c. power applied to the motor 10 to the maximum frequency. As a result, the frequency of a.c. power applied to the compressor motor 10 is changed to a value higher than the frequency on normal room cooling operation by the inverter 12. The microcomputer 13 also controls the blade 15 through the blade driving motor 16 to place the direction of the blade 15 downwardly, thereby allowing cool air to be blown off downwardly.

The operation of the first embodiment will be described in reference to the flow chart as shown in FIG. 2.

When the "spot" switch 4 is in the off state, it is judged at a step S-20 that the normal mode is selected. In the normal mode, the frequency of a.c. power applied to the compressor motor 10 is controlled by the microcomputer 13 and the inverter 12 so as to make the room temperature approach a set temperature at a step S-21. In this case, there is little case wherein the compressor motor 10 is driven in the maximum frequency which can be attained by the motor 10 because a normal temperature control is carried out.

After the frequency control have been carried out, the direction of the blade 15 is controlled by the blade driving motor 16 so as to blow off conditioned air in the horizontal direction at a step S-22.

On the other hand, when the "spot" switch 4 is turned on, it is judged at a step S-20 that a spot mode is selected. In the spot mode, the compressor motor 10 is driven the maximum frequency by the inverter 12 to lower the temperature of the conditioned air at a step S-23. After that, the microcomputer 13 controls the blade driving motor 16 to place the blowing direction of the conditioned air downwardly at a step S-24. In this way, cool air hits the user, allowing him to feel cool air sense.

If the time of the spot operation is restricted after it has been judged whether the spot mode or the normal mode is selected, there is no possibility that frost is formed on the indoor unit at the time of room cooling operation, and that even if the user forgets to return the air conditioning operating from the sport mode to the normal mode, he is adversely affected by the air conditioning in the spot mode. FIG. 3 is a flow chart wherein such restriction of the spot mode operation is carried out at a step S-25.

Figure 4:
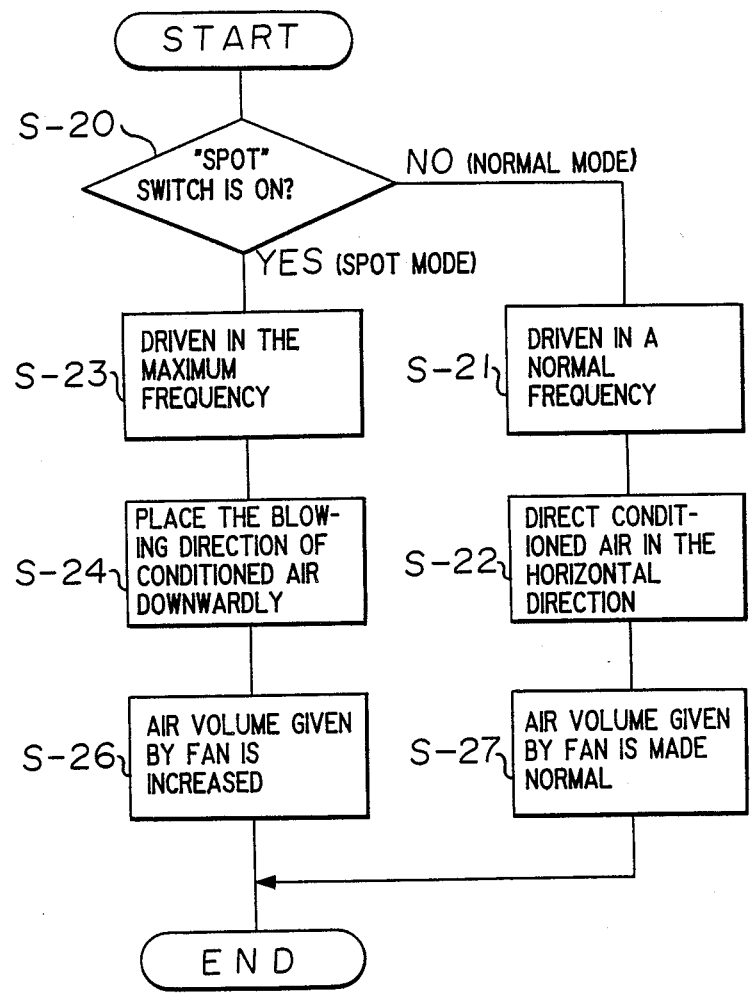

If the air volume given by a fan (not shown) in the indoor unit is increased after the flowing direction of the conditioned air is placed downwardly, it is possible to improve cool air sense given to the user in comparison with the embodiment as shown in FIG. 2. In case of the normal mode, the air volume given by the fan is made normal. FIG. 4 is a flow chart showing wherein increasing the air volume is carried out at a step S-26 and the air volume is made normal at a step S-27.

Although placing the blowing direction of the conditioned air downwardly and maximizing the frequency for the compressor are carried out in the spot mode, even only placing the blowing direction of the conditioned air can attain the purpose of giving cool air sense to the user, which is offered by the present invention.

As explained, in accordance with the first embodiment, when the user desires to allow cool air hit himself directly on room cooling operation, the blowing direction of the conditioned air into the room is placed downwardly, thereby giving cool air sense to the user directly.

In the first embodiment, the blowing direction of the conditioned air is controlled. Now, a second embodiment which takes advantage of the provision of an upper outlet port and a lower outlet port in an air conditioning device with the two outlet ports will be explained.

Figure 5:
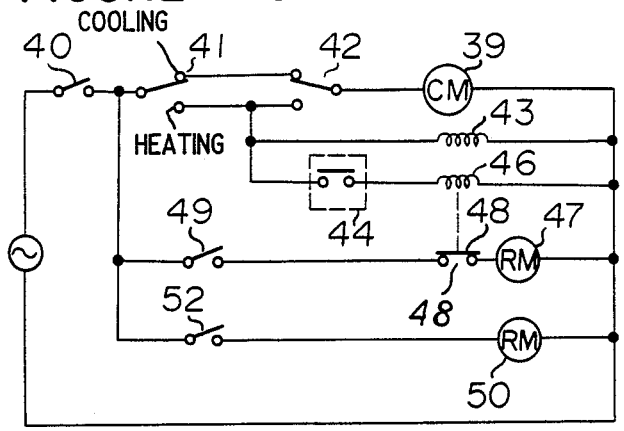
FIG. 5 is an electric circuit diagram of a second embodiment of the present invention.

The second embodiment will be described in reference to FIGS. 5 and 6. Explanation of the structure of a refrigerant circuit is omitted because it is the same as the conventional air conditioning device. In FIG. 5, reference numeral 40 designates a main switch. Reference numeral 41 designates a switch having a "cooling" contact and a "heating" contact for selecting either room cooling operation or room heating operation. Reference numeral 42 designates a thermostat which is actuated depending on the detection of a room temperature. An electric motor 39 for a compressor is connected to power through the switches 40, 41, and the thermostat 42. Reference numeral 43 designates a relay coil for a four port valve, which is connected to the "heating" contact of the switch 41. Reference numeral 46 designates a relay coil which controls a normally closed contact (further explained below) 48 for an upper fan motor 47. The relay coil 46 is connected to the "heating" contact of the switch 41 through a hot air blowing switch 44. The upper fan motor 47 is connected to the main switch 40 through the normally closed contact 48 and a switch 49. A lower fan motor 50 is connected to the main switch 40 through a switch 52.

Figure 6:
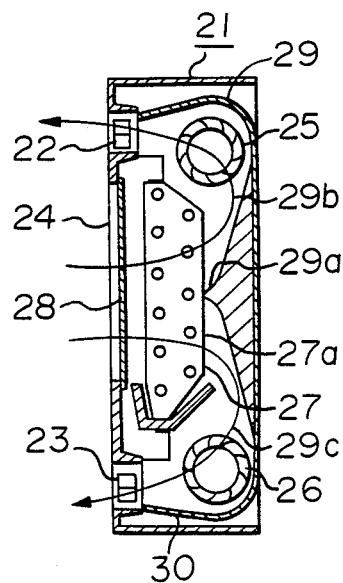
FIG. 6 is a vertical cross sectional view showing the indoor unit of the air conditioning device of the second embodiment.

In FIG. 6, elements indicated by reference numerals 21 through 40 are similar to those of the conventional air conditioner. The embodiment as shown in FIG. 6 is different from the conventional device in that fan casings 29 and 30 are extended to a partition plate 29a which is arranged at a middle position 27a on the rear surface of indoor heat exchanger so as to form an upper air path 29b and a lower air path 29c separately.

In the operation of the second embodiment, when a normal room heating operation is carried out, the main switch 40 is closed, and the switch 41 is placed in the "heating" contact connection to energize the relay coil 43 for the four port valve, thereby placing the refrigerant circuit in the room heating operation cycle. The switches 49 and 52 are closed to energize the upper fan motor 47 and the lower fan motor 50, thereby feeding conditioned air from the upper outlet port 22 and the lower outlet port 23. When the thermostat 42 is connected to the bheating" contact of the switch 41 as the result of the detection of a room temperature in this state, the compressor motor 39 is energized to drive compressor 31, thereby carrying out room heating operation.

If a user comes back and desires to allow warm air hit himself directly, he can close the hot air blowing switch 44 which is can be optionally actuated. As a result, the relay coil 46 is energized to open the associated contact 48, thereby ceasing to energize the upper fan motor 47. Feeding the conditioned air from the upper outlet port 22 is stopped, and the total air volume is, therefore, decreased. This allows the temperature of the indoor heat exchanger 27 to rise to increase the temperature of the conditioned air blown off from the lower outlet port 23, thereby satisfying the user's desire.

As explained, in accordance with the second embodiment, the hot air blowing switch 44 which the user can operates optionally is provided to be able to control the upper fan motor 47. As a result, hot air can be hit to the user depending on his desire. The first and second embodiments can offer advantage wherein when the user can feel cool air or warm air to his body directly at once, he can only depress the relevant switch to feel cool air or warm air to his body even if the entire inside of the room has not become cool or has not become warm.

The second embodiment has been explained in reference to the air conditioning device with the upper outlet port and the lower outlet port.

Now, a third embodiment which can take advantage of provision of the upper outlet port and the lower outlet port to effectively air condition an adjoining room as well will be explained in reference to FIGS. 7 through 10.

Figure 7:
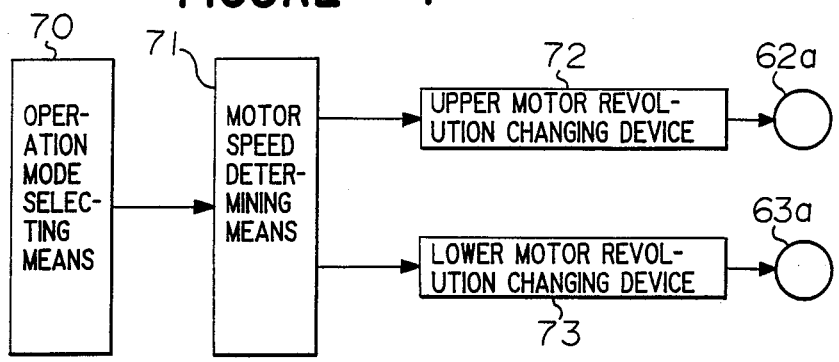
FIG. 7 is a principle block diagram showing the air flow control device of a third embodiment of the present invention.

FIG. 7 is a principle block diagram showing the air flow control device according to the third embodiment.

In FIG. 7, operation mode selecting means 70 is used to select either a normal mode wherein only a room with the indoor unit installed is air conditioned, or a two room air conditioning mode wherein the room with the indoor unit and a room which adjoins the room with the indoor unit installed through a partition and so on.

Motor speed determining means 71 functions to determine the revolutions of the upper fan and lower fan based on an operation mode command signal from the operation mode selecting means 70. The motor speed determining means 71 outputs a speed command signal to an upper motor revolution changing device 72 and a lower motor revolution changing device 73. The motor revolution changing devices 72 and 73 are connected to an upper fan motor 62a and a lower fan motor 63a, respectively, to drive the motors in either a speed appropriate to air condition a single room or a speed appropriate to air condition two rooms. This arrangement allows a single air conditioning device to air condition not only the room with the device but also the room with the device and its adjoining room comfortably.

A specific form based on the principle of the third embodiment will be described in detail in reference to FIGS. 8 through 10.

Figure 8:
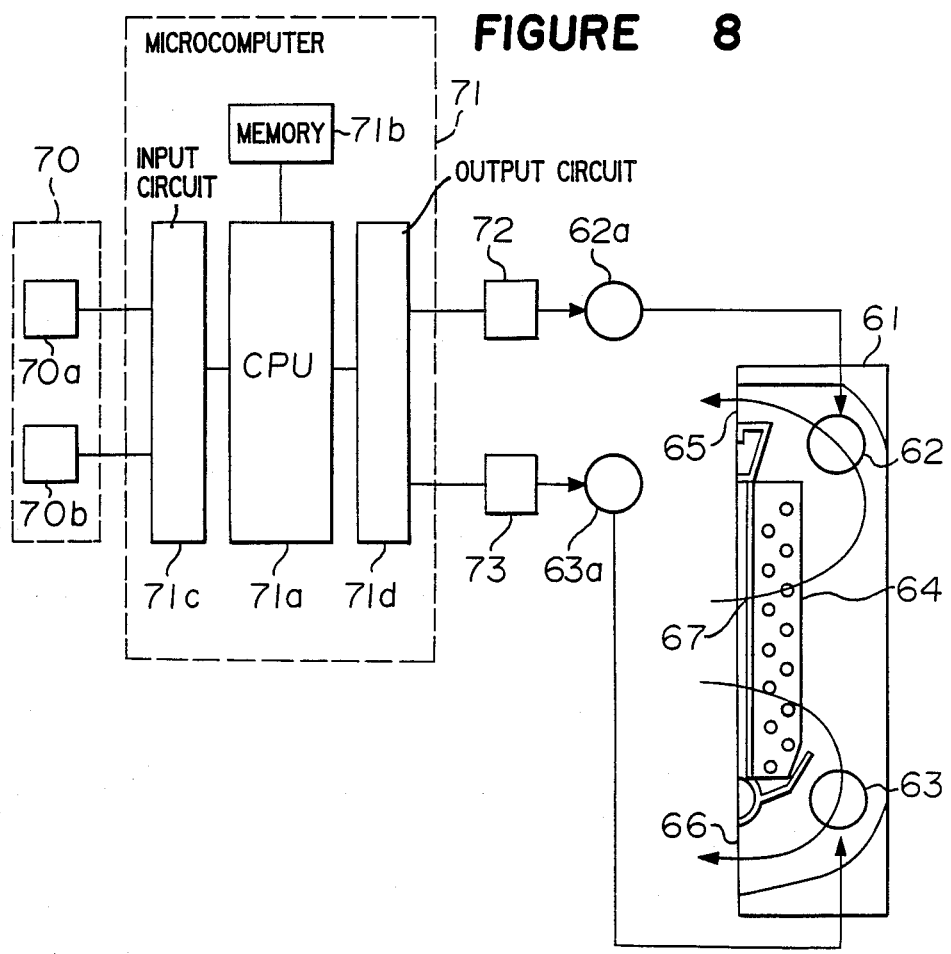
FIG. 8 is a schematic diagram showing the structure of the air flow control device of the third embodiment.

FIG. 8 is a block diagram showing the entire structure of the air flow control device of the third embodiment.

In FIG. 8, the operation mode selecting means 70 is constituted by a normal mode selecting switch 70a and a two room air conditioning mode selecting switch 70b.

The motor speed determining means 71 is constituted by a microcomputer which comprises a CPU (central processing unit) 71a for processing the determination of the revolutions of the upper and lower fan motors based on a mode command from the operation mode selecting switches 70a and 70b so as to make the revolutions correspond to each operation mode, a memory 71b for storing the results of the process in the CPU 71a and a program for determining the motor speed and so on, an input circuit 71c for taking a command signal produced by the operation of the mode selecting switches 71a and 70b into the CPU 71a, and an output circuit 71d for output a speed command signal produced as the result of the process in the CPU 71a to the upper fan motor revolution changing device 72 and the lower fan motor revolution changing device 73.

Figure 16:
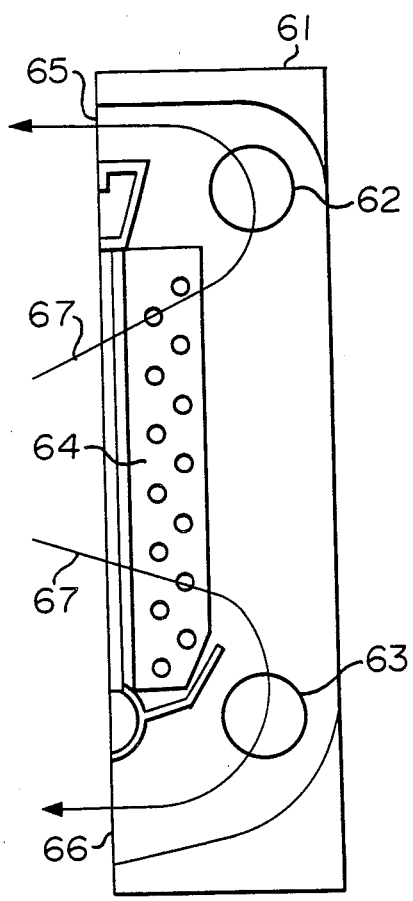
FIG. 16 is a vertical cross sectional view of the indoor unit of the conventional device.

The upper fan motor 62a controlled by the upper fan motor revolution changing device 72 is mechanically connected to an upper fan 62 in the indoor unit 61. The lower fan motor 63a controlled by the lower fan motor revolution changing device 73 is mechanically connected to a lower fan 63 in the indoor unit. In FIG. 8, the same reference numerals as those in FIG. 16 indicate similar parts.

The operation of the third embodiment as constructed above will be explained.

A user turns on either the operation mode switch 70a or the operation mode switch 70b to select whether only the room with the indoor unit 61 installed should be air conditioned or the two rooms including the room next to the room with the indoor unit should be air conditioned. The operation mode command desired by the user is taken into the CPU 71a through the input the circuit 71c. The CPU 71a determines the revolutions of the upper fan 62 and the lower fan 63 depending on the operation mode command. The program for processing the determination of the revolutions is stored in the memory 71b, and the CPU 71a decodes the program and executes it, thereby carrying out air flow control. Such air flow control will be described in reference to a flow chart as shown in FIG. 9.

Figure 9:
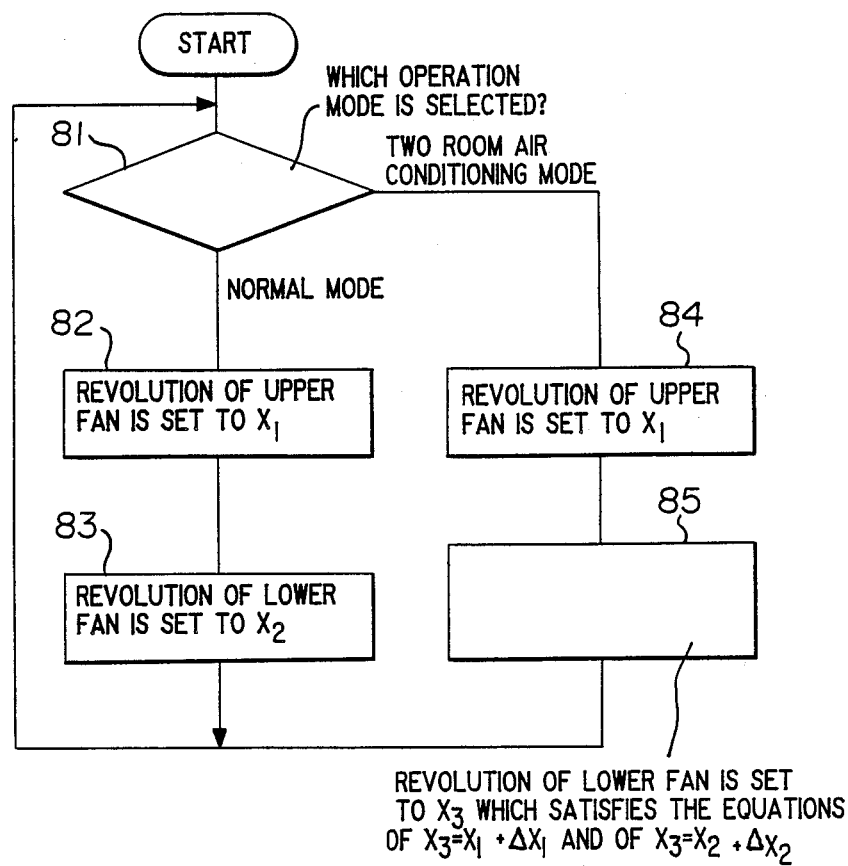
FIG. 9 is a flow chart to help explain the operation of the third embodiment.

When the program of FIG. 9 starts, it is judged at a step 81 whether the operation mode selected by the operation mode selecting switch 70a or 70b is "normal mode" or "two room air conditioning mode". If it is judged that the "normal mode" is selected as the operation mode, the process proceeds to a step 82 where the revolution of the upper fan 2 is set to $X_1$ rpm. At the next step 83, the revolution of lower fan 63 is set to $X_2$ rpm. In this way, the upper fan 62 and the lower fan 63 are simultaneously driven in the revolutions which are appropriate to air conditioned a single room as usual. In this case, the revolutions of both fans which are appropriate to air condition a single room is preferably be determined so that a rotation ratio which can minimize noise level at a simultaneous operation is realized or low noise operation can be realized with the volume of air flow from both ports restrained. It is because it is enough to make cool air from both fans reach in a short distance.

As a result, when the "normal mode" is selected, comfortable atmosphere can be produced at the low noise operation.

On the other hand, if it is judged at the step 81 that the "two room air conditioning mode" is selected as the operation mode, the process proceeds to a step 84 where the revolution of the upper fan 62 is set to $X_1$ rpm that is the same as the normal mode.

At the next step 85, the revolution of the lower fan 63 is set to $X_3$ rpm wherein $X_3$ satisfies the equation of $X_3 = X_2 + \Delta X_2$, i.e. is bigger than $X_2$. The revolution $X_3$ of the lower fan 63 also satisfies the equation of $X_3 = X_1 + \Delta X_1$, and is larger than the revolution $X_1$ of the upper fan 63, because it is necessary to make the conditioned air from the lower outlet port reach at a distance further than that from the outlet port.

That is to say, the equations of $X_3 = X_2 + \Delta X_2$ and of $X_3 = X_1 + \Delta X_3$ must hold.

Figure 10:
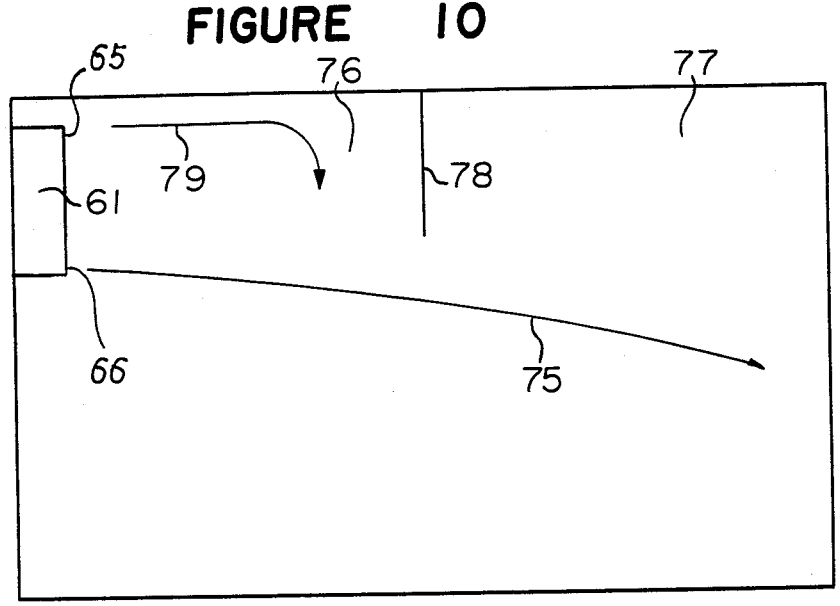
FIG. 10 is an illustration showing the air blowing state of the conditioned air into the room.
Figure 17:
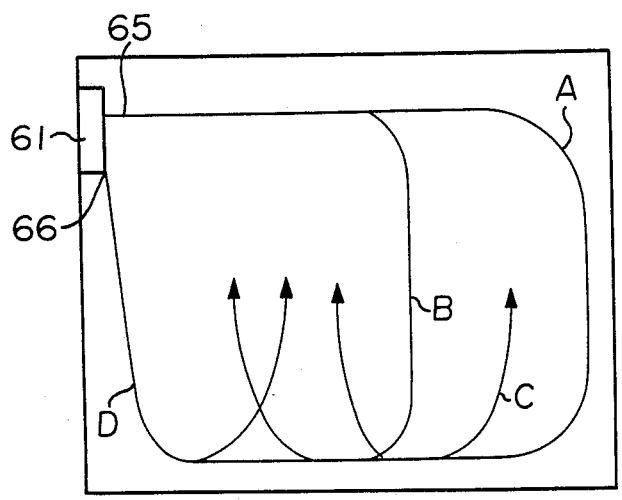
FIG. 17 is an illustration showing the air blowing state of the conditioned air blown off into a room with the indoor unit.
Figure 11:
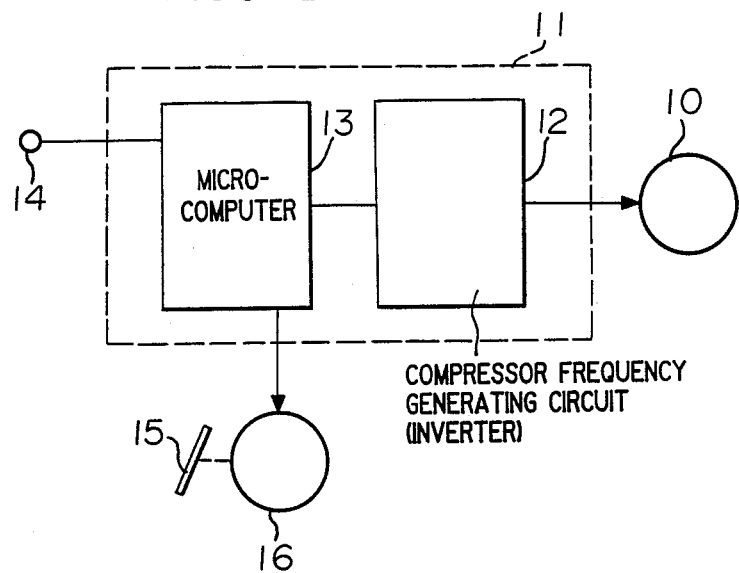
FIGS. 11 and 12 show the essential parts of the conventional inverter drive type of air conditioning device, FIG. 11 being a block diagram
Figure 12:
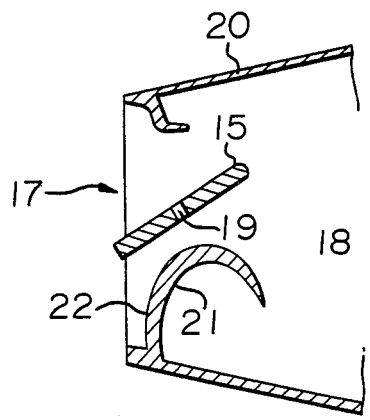
Figure 13:
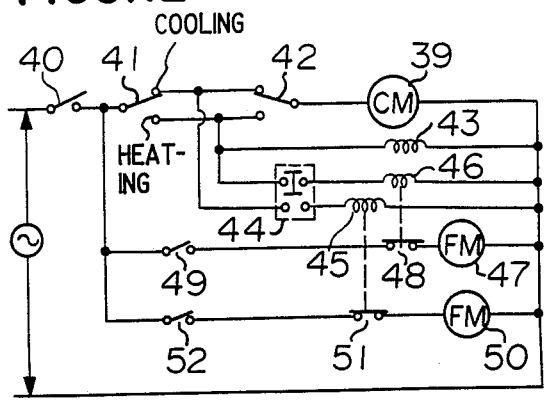
FIG. 13 is an electric circuit diagram of the conventional device.
Figure 14:
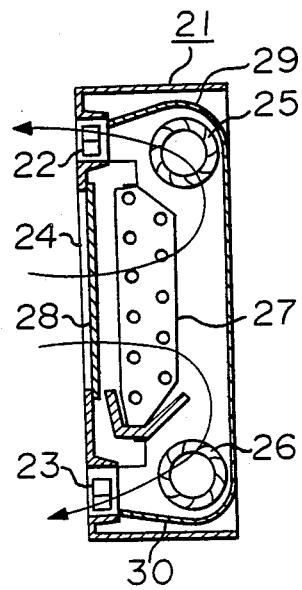
FIG. 14 is a vertical cross sectional view of the indoor unit of the conventional device.
Figure 15:
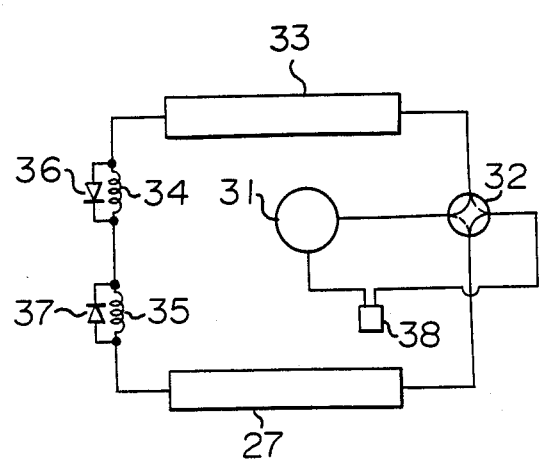
FIG. 15 is a refrigerant circuit of the conventional device.

Such air flow control allows air volume given by the lower fan 63 to increase so that the conditioned air from the lower outlet port 66 can pass through the room 76 with the indoor unit and drastically as indicated an arrow 75 in FIG. 10 to reach its adjoining room 77. Even if there is a projection 78 formed by a fixed partition which is provided at an upper portion between the room 76 with the indoor unit and its adjoining room 77, the conditioned air can pass below the projection 78 because the air feed to the adjoining room 77 is made by the conditioned air from the lower outlet port 66. In this way, the conditioned air blown off from the lower outlet port 66 can come into the adjoining room 77 to air condition mainly the room 77.

The air volume of the conditioned air from the upper outlet port 65 has the same level as the normal mode as indicated an arrow 79 in FIG. 10, which is enough to make the conditioned air reach in a distance corresponding to the single room air condition. If there is the projection 78, the conditioned air from the upper outlet port 65 can not flow into the adjoining room 77 because it is prevented from flowing into it by the projection 78. In this way, the conditioned air from the upper outlet port air conditions mainly the room 76 with the indoor unit.

Thus, the lower fan 63 air conditions the adjoining room 77 while the upper fan 62 air conditions the room 76 with the indoor unit. As a result, the upper outlet port 65 and the lower outlet port 66 can be assigned to air condition the corresponding rooms, respectively, to realize the two room air conditioning in a comfortable state by a single indoor unit.

Although the third embodiment has been explained in reference to a wall mounted type of air conditioning device, the application of the third embodiment is not limited to the wall mounted one. Even if the device is arranged in a wall or a part of the device is mounted on a ceiling, similar advantage can be offered as long as the device has the upper outlet port and the lower outlet port.

As explained, in the air conditioning device with the upper outlet port and the lower outlet port according to the third embodiment, it is possible to select either the "normal mode" wherein the room with the indoor unit is air conditioned or the "two room air conditioning mode" wherein a room which adjoins the room with the indoor unit is also air conditioned. The revolutions of the upper fan and the lower fan are controlled to produce the air volume of the conditioned air which is appropriate to air condition a single room or two rooms depending on the mode selection. When the "two room air conditioning mode" is selected, the revolution of the lower fan is set to a value higher than that of the upper fan. As a result, it is possible to air condition not only the room with the indoor unit but also two rooms including a room adjoining the room with the indoor unit, to produce comfortable atmosphere as desired by the user.

We claim:

1. An air conditioning device comprising:
   a refrigerant compression cycle having an electrically driven compressor;
   an electric motor for driving the compressor;
   frequency changing means for changing the frequency of a.c. power to be applied to the motor;
   an outlet port for blowing off conditioned air;
   flowing direction changing means for changing the flowing direction of the conditioned air from the outlet port;
   a switch which is actuated by a user when he desires to allow the conditioned air to hit himself directly; and
   control means for controlling the frequency changing means and the flowing direction changing means;
   wherein when the switch is actuated during room cooling operation, the control means outputs to the flowing direction changing means a signal for directing the conditioned air from the outlet port in a downward flowing direction and wherein when said switch is actuated the frequency of said A.C. power supplied to said compressor is changed.

2. An air conditioning device comprising:
   outlet ports provided in an upper portion and a lower portion of the device, respectively;
   upper and lower fans which are arranged to blow off conditioned air from the outlet ports, respectively;
   upper and lower independent air paths which are formed by extending upper and lower fan casings to a position at the middle portion of the rear surface of a heat exchanger;
   a switch for selecting either room cooling operation or room heating operation;
   a hot conditioned air blowing switch for manual actuation when raising the temperature of the conditioned air during the room heating operation is desired;
   upper and lower fan motors for driving the upper and lower fans independently; and
   a switching circuit for driving only the lower fan motor when the hot conditioned air blowing switch is actuated during the room heating operation.

3. An air conditioning device wherein a heat exchanger is arranged to face an intake port, and upper and lower fans are arranged in an upper outlet port and a lower outlet port, respectively, so as to direct air inspired from the intake port through the heat exchanger to the fans, comprising:
   operation mode selecting means for selecting either a normal mode or a two room air conditioning mode, the normal mode being for air conditioning a room with the indoor unit installed, and the two room air conditioning mode being for air conditioning the room with the indoor unit and its adjoining room,
   motor speed determining means for determining the revolutions of the fans so as to obtain the conditioned air in the amounts of volume suitable to air condition only the room with the indoor unit and to air condition its adjoining room as well, based on mode command signals from the operation mode selecting means, and for increasing the revolution of the lower fan in comparison with that of the upper fan when the two room air conditioning mode is selected, and
   motor revolution changing means for controlling the upper and lower fans independently under the control by a speed command signal from the motor speed determining means.

* * * * *